United States Patent

Ohkubo et al.

[11] Patent Number: 5,823,868
[45] Date of Patent: Oct. 20, 1998

[54] AIR-CONDITIONING SYSTEM MALFUNCTION COMPENSATION METHOD AND APPARATUS

[75] Inventors: Masashi Ohkubo; Hideo Machida, both of Saitama-ken, Japan

[73] Assignee: Zexel Corporation, Tokyo, Japan

[21] Appl. No.: 827,695

[22] Filed: Apr. 10, 1997

[30] Foreign Application Priority Data

Apr. 25, 1996 [JP] Japan .................................. 8-105745

[51] Int. Cl.$^6$ .................................................. B60H 1/00
[52] U.S. Cl. ................................................................ 454/121
[58] Field of Search ........................... 454/75, 121, 124, 454/126; 251/124.05

[56] References Cited

U.S. PATENT DOCUMENTS 5,291,111  3/1994  Hirano ...................................... 318/563
5,596,253  1/1997  Mizuta et al. ........................... 318/469
5,647,794  7/1997  Ohkubo et al. .......................... 454/121

FOREIGN PATENT DOCUMENTS 63-2716  1/1988  Japan .

Primary Examiner—Harold Joyce
Attorney, Agent, or Firm—Kanesaka & Takeuchi

[57] ABSTRACT

When the built-in contacts of an actuator for driving a mode switching door malfunction or when a control unit for controlling a stepping motor actuator for driving a mode switching door malfunctions, the actuator is turned to a ventilation mode position or a defrost mode position and then turned reversely from the above position as a starting point to be set to another mode position.

9 Claims, 13 Drawing Sheets

FIO. 14 PRIOR ART
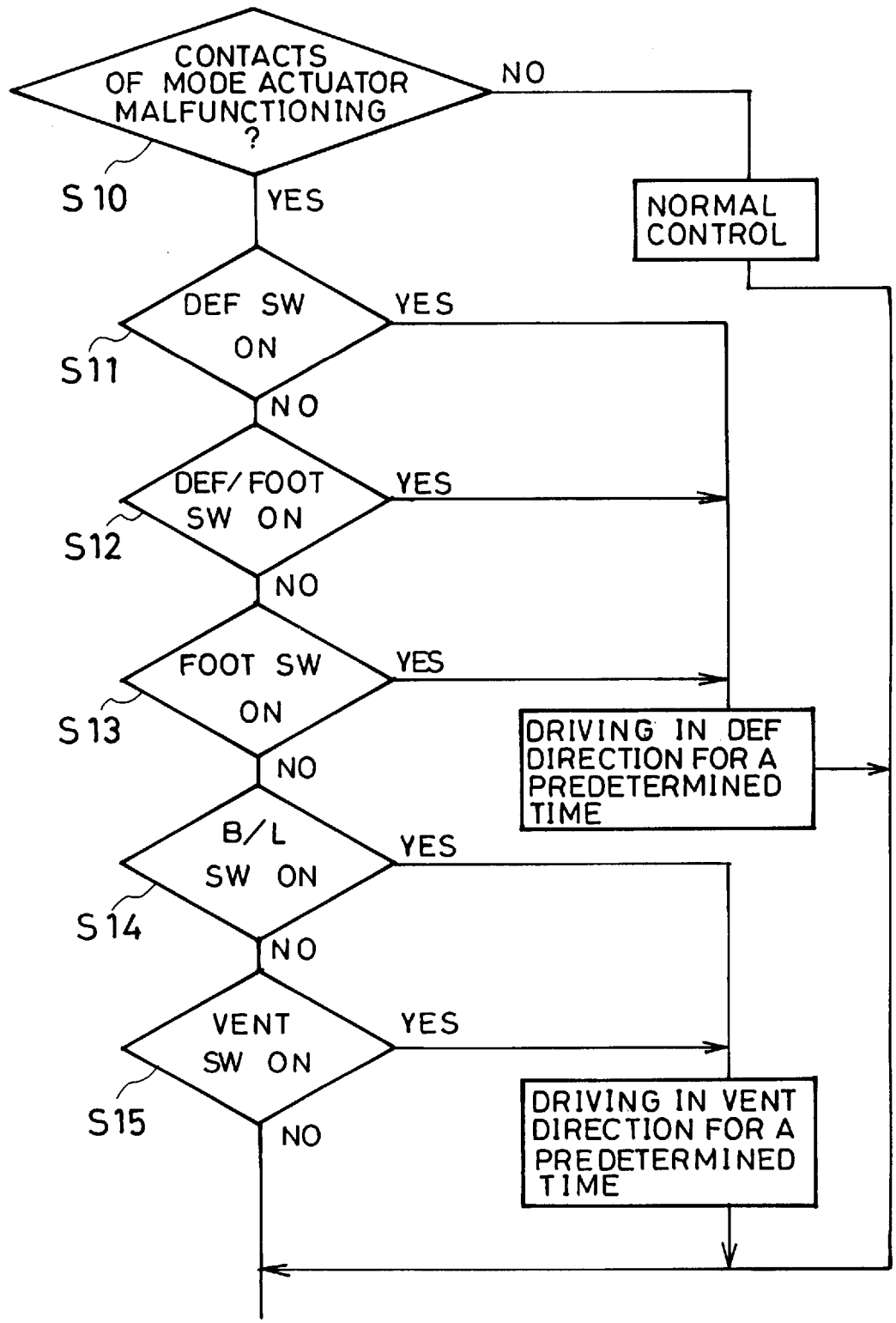

AIR-CONDITIONING SYSTEM MALFUNCTION COMPENSATION METHOD AND APPARATUS

BACKGROUND OF THE INVENTION

1. Field of the Invention

This invention relates to an air-conditioning system malfunction compensation method and apparatus which are used when position setting contacts of an actuator for driving a mode switching door malfunction or an abnormality occurs in a control unit of the actuator.

2. Prior Art

Generally speaking, an air-conditioning system blows out air whose temperature has been adjusted to an appropriate temperature by an air mix door from a ventilation air port, foot air port, defrost air port and the like at the downstream of a duct. In this case, a mode switching door is located at the downstream of the duct and controlled by an actuator. The control modes of the mode switching door are defrost, defrost/foot, foot, bilevel and ventilation modes, for example, which are set by a mode change-over switch.

FIG. 12 shows an example of an actuator control system for controlling the above mode switching door of the prior art as disclosed in Laid-open Japanese Patent Application No. Sho 63-2716, for example. In the figure, reference numeral 1 denotes a control unit having a microcomputer 2 whose output controls a drive circuit 3 composed of a circuit for controlling the normal rotation and reverse rotation of a motor. The output of this drive circuit 3 is supplied to the motor 5 constituting the actuator 4 for controlling the mode switching door.

Reference numeral 6 denotes a mode change-over switch provided on an air-conditioning system operation panel located near a dashboard of a car. This mode change-over switch consists of a defrost switch 7, a defrost/foot switch 8, a foot switch 9, a bilevel switch 10 and a ventilation switch 11 and mode setting signals corresponding to these switches 7 to 11 are applied to the above microcomputer 2.

The above actuator 4, as shown in FIG. 11, controls the opening of the mode switching door 13 through a link unit or gear unit 12 and the mode switching door 13 consists of a door 13a for controlling the amount of air blown from the foot air port F at the downstream of the duct and a door 13b for controlling the amount of air blown from branch ducts D1 and D2 branching off in upper and lower directions from an upper position of the downstream of the duct. In FIG. 11, MD stands for an air mix door.

In FIG. 12, a setting unit 19 consisting of a ventilation mode setting contact 14, a bilevel mode setting contact 15, a foot mode setting contact 16, a defrost/foot mode setting contact 17 and a defrost mode setting contact 18 is provided in a casing constituting the actuator 4. These contacts 14 to 18, as shown in FIG. 13, are arranged on an output flat gear, not shown, of the motor 5 and are composed of a movable contact 20 which moves together with this output flat gear and fixed contacts 21 provided on the inside wall of the casing which faces the output flat gear. Therefore, when the output gear moves along with the rotation of the motor, the movable contact 20 moves simultaneously and contacts a fixed contact 21 to turn on a mode. The outputs of the contacts 14 to 18 are supplied to the microcomputer 2 through an input circuit 22. The fixed contact 21 of the ventilation mode setting contact 14 is located at a position corresponding to the position where the mode switching door 13 driven by the actuator is set to a ventilation mode, the fixed contact 21 of the bilevel mode setting contact 15 at a position corresponding to the position where the mode switching door 13 is set to a bilevel mode, the fixed contact 21 of the foot mode setting contact 16 at a position corresponding to the position where the mode switching door 13 is set to a foot mode, the fixed contact 21 of the defrost/foot mode setting contact 17 at a position corresponding to the position where the mode switching door 13 is set to a defrost/foot mode, and the fixed contact 21 of the defrost mode setting contact 18 at a position corresponding to the position where the mode switching door 13 is set to a defrost mode. In other words, the actuator turns in a section L between the position of the ventilation mode setting contact 14 and the position of the defrost mode setting contact 18 at both ends and stops at the position of each of the contacts 14 to 18.

In the above constitution, when the defrost switch 7 is turned on, the microcomputer 2 drives the motor 5 of the actuator 4 in a defrost mode direction and thereby the movable contact 20 moves. When the movable contact 20 contacts the fixed contact 21 of the defrost mode setting contact 18 (the defrost mode setting contact 18 is turned on), this ON signal is applied through the input circuit 22 to the microcomputer 2 which then stops the motor 5. Thereby, the mode switching door 13 is set to a defrost mode (mode for blowing air from the defrost air port).

When the defrost/foot switch 8 is turned on, the microcomputer 2 drives the motor 5 of the actuator 4 in a defrost/foot mode direction and thereby the movable contact 20 moves. When the movable contact 20 contacts the fixed contact 21 of the defrost/foot mode setting contact 17 (the defrost/foot mode setting contact 17 is turned on), the ON signal is applied through the input circuit 22 to the microcomputer 2 which then stops the motor 5. Thereby, the mode switching door 13 is set to a defrost/foot mode (mode for blowing air from both the defrost air port and the foot air port).

When the foot switch 9 is turned on, the microcomputer 2 drives the motor 5 of the actuator 4 in a foot mode direction and thereby the movable contact 20 moves. When the movable contact 20 contacts the fixed contact 21 of the foot mode setting contact 16 (the foot mode setting contact 16 is turned on), the ON signal is applied through the input circuit 22 to the microcomputer 2 which then stops the motor 5. Thereby, the mode switching door 13 is set to a foot mode (mode for blowing air from the foot air port).

When the bilevel switch 10 is turned on, the microcomputer 2 drives the motor 5 of the actuator 4 in a bilevel mode direction and thereby the movable contact 20 moves. When the movable contact 20 contacts the fixed contact 21 of the bilevel mode setting contact 15 (the bilevel mode setting contact 15 is turned on), this ON signal is applied through the input circuit 22 to the microcomputer 2 which then stops the motor 5. Thereby the mode switching door 13 is set to a bilevel mode (mode for blowing air from both the ventilation air port and the foot air port).

When the ventilation switch 11 is turned on, the microcomputer 2 drives the motor 5 of the actuator 4 in a ventilation mode direction and thereby the movable contact 20 moves. When the movable contact 20 contacts the fixed contact 21 of the ventilation mode setting contact 14 (the ventilation mode setting contact 14 is turned on), the ON signal is applied through the input circuit 22 to the microcomputer 2 which then stops the motor 5. Thereby the mode switching door 13 is set to a ventilation mode (mode for blowing air from the ventilation air port).

However, according to the above constitution, when foreign matters in the casing are adhered to the surfaces of the fixed contacts 21 or the surface of the movable contact 20 of the actuator 4 or when a contact failure occurs, an ON signal cannot be obtained from a mode setting contact. As a result, the actuator 4 malfunctions, thereby causing such a trouble that a foot mode cannot be obtained even in winter, for example.

Then, in the air-conditioning system of the prior art, as shown in FIG. 14, when it is judged that the actuator 4 of the mode switching door 13 malfunctions and one of the defrost mode setting contact 18, the defrost/foot mode setting contact 17 and the foot mode setting contact 16 is operated, the mode switching door 13 is automatically set to a defrost mode, and when one of the ventilation mode setting contact 14 and the bilevel mode setting contact 15 is operated, the mode switching door 13 is automatically set to a ventilation mode to ensure the minimum level of air conditioning.

To set a ventilation mode when the contacts of the actuator 4 malfunction, in FIG. 13, the actuator 4 is kept turned in a ventilation mode direction (counterclockwise) for a predetermined time so that the mode switching door 13 contacts the wall of an unshown duct and the actuator 4 is thereby stopped at the ventilation mode position.

To set a defrost mode when the contacts of the actuator 4 malfunction, in FIG. 13, the actuator 4 is kept turned in a defrost mode direction (clockwise) for a predetermined time so that the mode switching door 13 contacts the wall on the opposite side of the unshown duct and the actuator 4 is thereby stopped at the defrost mode position.

A stepping motor actuator without the contact setting unit 19 like that of the actuator 4 shown in FIGS. 12 and 13 is used in some cases. To control the mode switching door 13 using this stepping motor actuator, the control unit does not need a circuit equivalent to the input circuit 22 of FIG. 12. For example, the drive circuit is controlled by the microcomputer to control the amount of movement of the stepping motor actuator, thereby controlling the position of the mode switching door 13.

However, when the actuator 4 equipped with the contact setting unit 19 is used, air conditioning in a ventilation mode or defrost mode is possible when the contacts 14 to 18 malfunction. However, modes between these modes, that is, bilevel mode, foot mode and defrost/foot mode cannot be obtained and an air conditioning feeling is bad.

When a stepping motor actuator is used as an actuator and some abnormality occurs in the control unit for controlling the stepping motor actuator, the position control of the mode switching door is impossible.

SUMMARY OF THE INVENTION

It is therefore an object of the present invention to set an appropriate air-conditioning mode even when the contacts of the setting unit of the actuator having contacts malfunction or when some abnormality occurs in the control unit for the stepping motor actuator.

A malfunction compensation method according to claim 1 of the present invention makes it possible to set the actuator to another mode position by turning the actuator to a ventilation mode position or a defrost mode position and turning it reversely from the above position as a starting point for a predetermined time.

A malfunction compensation method according to claim 2 is such that, at the time of malfunctioning of the setting unit of the actuator, the actuator is turned to a defrost mode position when the defrost switch is turned on, the actuator is turned to a defrost mode position and then turned reversely for a predetermined section when the foot switch is turned on, the actuator is turned to a defrost mode position and then turned reversely for a section shorter than the above reverse section when the defrost/foot switch is turned on, and the actuator is turned to a ventilation mode position when the ventilation switch is turned on, and the actuator is turned to a ventilation mode position and then turned reversely for a predetermined section when the bilevel switch is turned on.

A malfunction compensation method according to claim 3 is such that the reverse time is preset in accordance with the drive voltage of the motor of the actuator so that the actuator is turned reversely for that reverse time.

A malfunction compensation method according to claim 4 is such that, when a stepping motor actuator is used as the actuator and the control unit of the stepping motor actuator malfunctions, the malfunction compensation method of claim 1 is practiced.

A malfunction compensation method according to claim 5 is such that, when a stepping motor actuator is used as the actuator and the control unit of the stepping motor actuator malfunctions, the malfunction compensation method of claim 2 is practiced.

A malfunction compensation apparatus according to claim 6 comprises drive means for driving the above stepping motor actuator, abnormality detection means for detecting an abnormality in the control unit and a control unit having compensation processing means to practise the malfunction compensation method of claim 4 with the above compensation processing means.

A malfunction compensation apparatus according to claim 7 comprises compensation processing means for practicing the malfunction compensation method of claim 5 in the control unit.

According to claim 8, the above compensation processing means is formed of a microcomputer.

According to claim 9, the microcomputer for instructing whether the stepping motor actuator is turned normally or reversely is provided in the control unit and the compensation processing means is formed of an arithmetic processing unit for controlling the drive means based on an instruction from the microcomputer.

BRIEF DESCRIPTION OF THE DRAWINGS

FIG. 14 is a flow chart showing the operation of FIG. 12.

DETAILED DESCRIPTION OF THE PREFERRED EMBODIMENTS

Embodiment 1

Figure 1:
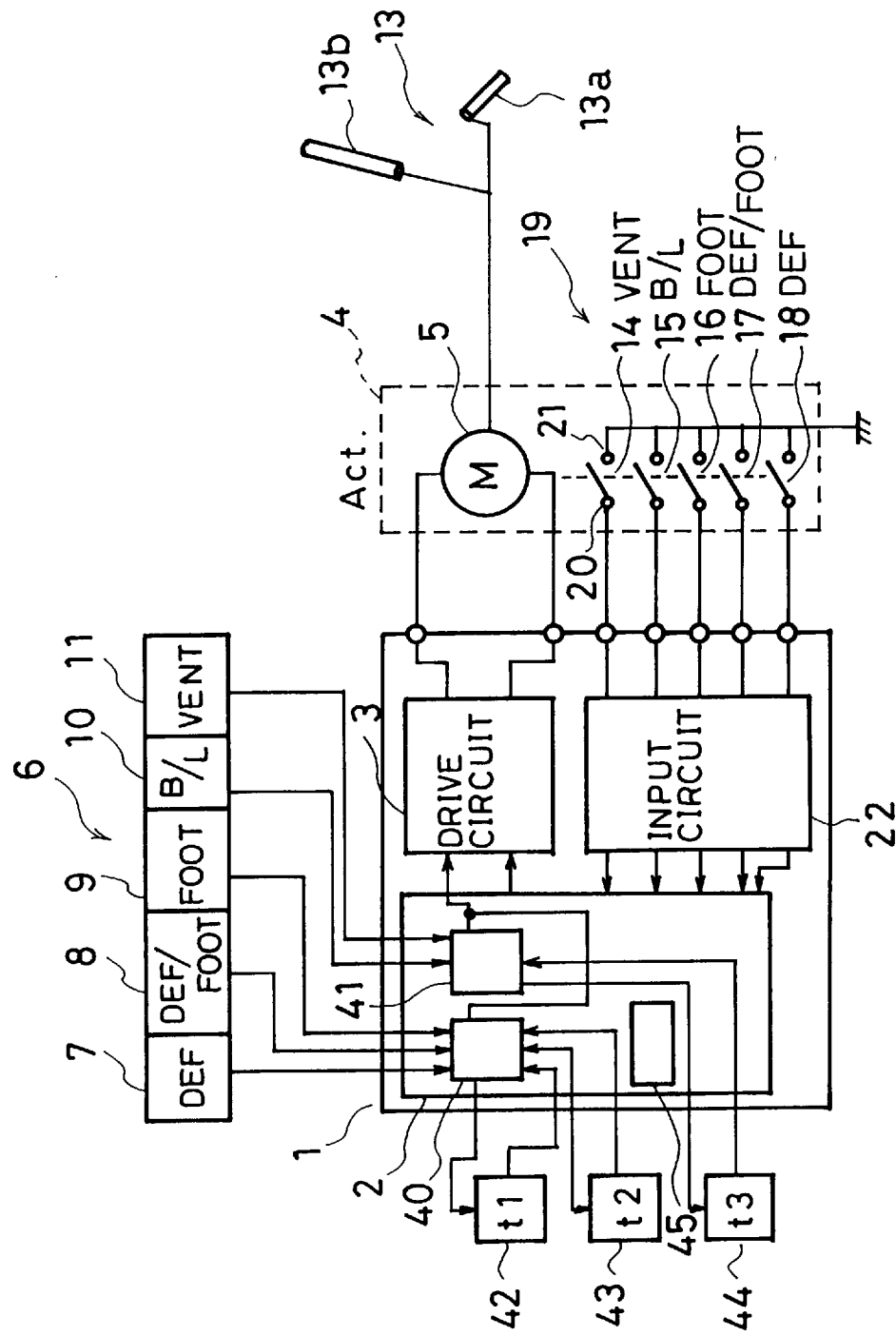
FIG. 1 is a block diagram of Embodiment 1 of the present invention.
Figure 2:
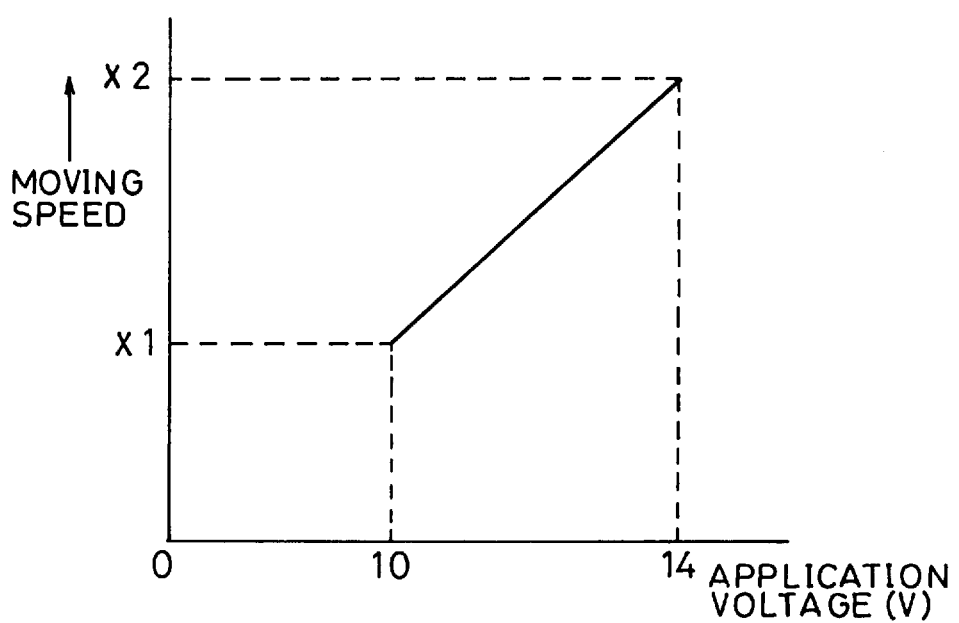
FIG. 2 is a characteristic diagram for explaining Embodiment 1.
Figure 12:
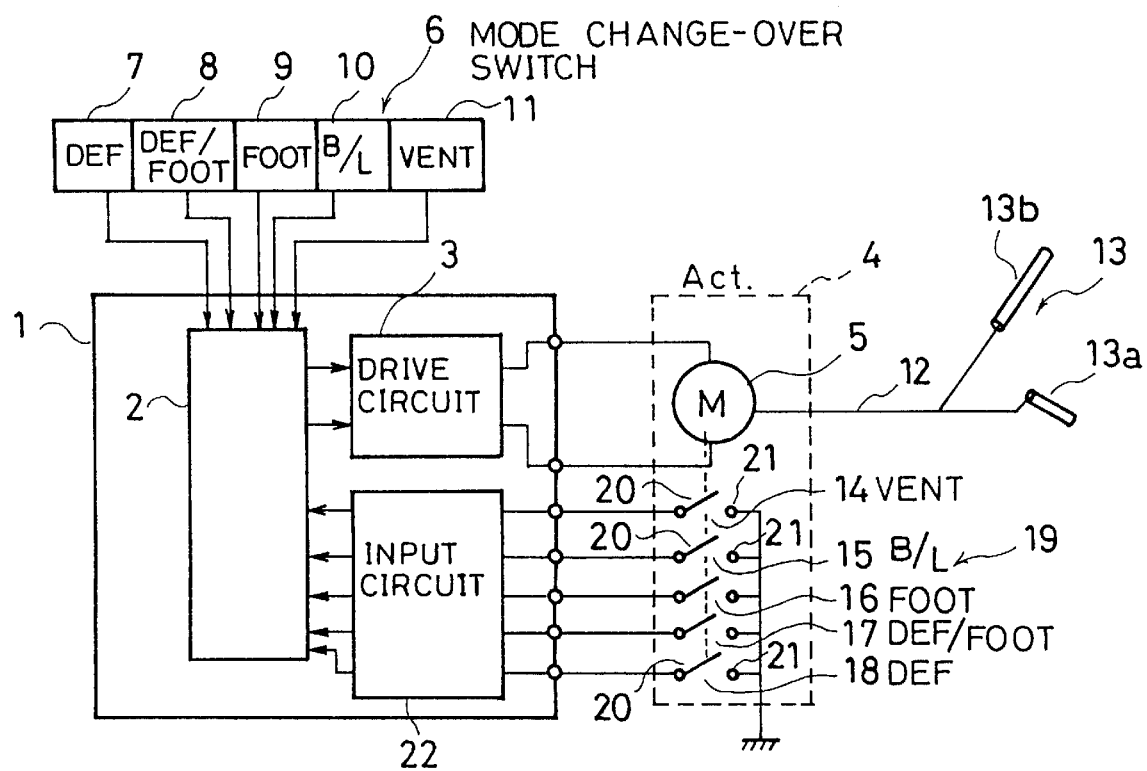
FIG. 12 is a block diagram showing an example of an air-conditioning system malfunction compensation method of the prior art.
Figure 13:
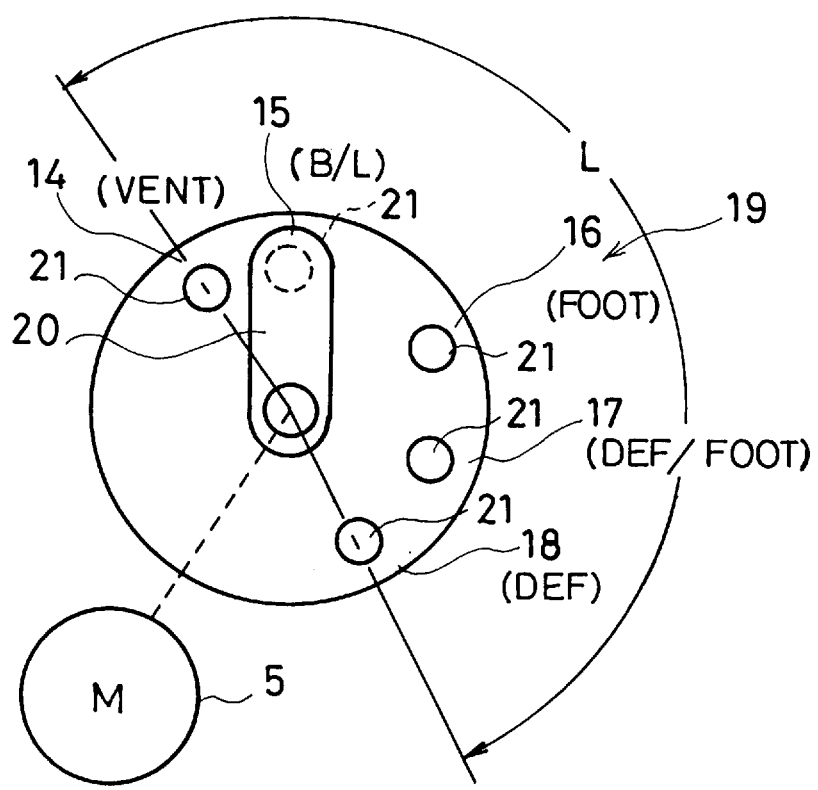
FIG. 13 is a structural diagram showing the operation of FIG. 12.

FIG. 1 is a block diagram showing an air-conditioning system malfunction compensation method according to Embodiment 1 of the present invention. The same elements as those in FIG. 12 are given the same reference symbols. In FIG. 1, reference numeral 40 denotes defrost mode setting means, 41 ventilation mode setting means, and 42 to 44 timers. Numeral 45 denotes a contact malfunction detection circuit which judges that the actuator 4 malfunctions when it cannot obtain an ON signal from any one of the contacts 14 to 18 specified by the mode change-over switch 6 within a predetermined time. The timer 42 outputs a time-up signal after the passage of a time t1 from the start of counting time, that is, activation, the timer 43 after the passage of a time t2, and the timer 44 after the passage of a time t3. The time t1 is a time required for the actuator 4 to reach a defrost/foot mode position from a defrost mode position, t2 a time required for the actuator 4 to reach a foot mode position from a defrost mode position and t3 a time required for the actuator 4 to reach a bilevel mode position from a ventilation mode position. These times are determined according to the moving speed of the actuator which is determined by the application voltage of the motor 5 of the actuator 4 as shown in FIG. 2 and the moving distance of the actuator (distance from a defrost mode position to a defrost/foot mode position, distance from a defrost mode position to a foot mode position and distance from a ventilation mode position to a bilevel mode position). As shown in FIG. 2, it is known that the moving speed of the actuator 4 from x1 to x2 increases in proportion to the application voltage of the motor 5 and therefore, the moving speed can be easily detected by obtaining the application voltage of the motor 5.

When a defrost switch 7 is turned on, the defrost setting means 40 controls the actuator 4 based on a signal from the defrost switch 7 to make the mode switching door 13 to open the defrost air port (set a defrost mode). When a defrost/foot switch 8 is turned on, this defrost setting means 40 controls the motor 5 based on a signal from the defrost/foot switch 8 to set the mode switching door 13 to a defrost mode and then activates the timer 42 to reverse the motor 5 from the defrost mode for the time t1 preset by the timer 42. Thereby, the actuator 4 is set to a defrost/foot mode.

When a foot switch 9 is turned on, the defrost setting means 40 controls the motor 5 based on a signal from the foot switch 9 to set the mode switching door 13 to a defrost mode and then activates the timer 43 to reverse the motor 5 from the defrost mode for the time t2 preset by the timer 43. Thereby, the actuator 4 is set to a foot mode.

When a ventilation switch 11 is turned on, the ventilation mode setting means 41 controls the actuator 4 based on a signal from the ventilation switch 11 to make the mode switching door 13 to open the ventilation air port (set a ventilation mode). When a bilevel switch 10 is turned on, the ventilation mode setting means 41 controls the motor 5 based on a signal from the bilevel switch 10 to set the mode switching door 13 to a ventilation mode and then activates the timer 44 to reverse the motor 5 from the ventilation mode for the time t3 preset by the timer 44. Thereby, the mode switching door 13 is set to a bilevel mode.

In the above constitution, the operation of the air-conditioning system malfunction compensation method of the present invention is explained with reference to FIG. 3.

First, in step S1, when the contact malfunction detection circuit 45 does not judge that the actuator 4 malfunctions, normal control is carried out. In accordance with the operation of the mode change-over switch 6, the position of the mode switching door 13 is set to one of defrost, defrost/foot, foot, bilevel and ventilation modes.

When the contact malfunction detection circuit 45 judges that the actuator 4 malfunctions, the routine proceeds to step S2. When the defrost switch 7 is turned on in step S2, the mode switching door 13 is driven in a defrost direction for a predetermined time based on the operation of the defrost setting means 40 so that it is set to a defrost mode.

When the defrost switch 7 is not turned on in step S2, the routine proceeds to step S3. When the defrost/foot switch 8 is turned on in step S3, the defrost setting means 40 sets the mode switching door 13 to a defrost mode position and then activates the timer 42 to reverse the mode switching door 13 in a ventilation direction for the time t1 preset by the timer 42 (until the timer 42 outputs a time-up signal). Thereby, the mode switching door 13 is set to a defrost/foot mode.

When the defrost/foot switch 8 is not turned on in step S3, the routine proceeds to step S4. When the foot switch 9 is turned on in step S4, the defrost setting means 40 sets the mode switching door 13 to a defrost mode position and then activates the timer 43 to reverse the mode switching door 13 in a ventilation direction for the time t2 preset by the timer 43 (the timer 43 outputs a time-up signal). Thereby, the mode switching door 13 is set to a foot mode.

When the foot switch 9 is not turned on in step S4, the routine proceeds to step S5. When the bilevel switch 10 is turned on in step S5, the ventilation mode setting means 41 sets the mode switching door 13 to a ventilation mode position and then activates the timer 44 to reverse the mode switching door 13 in a ventilation direction for the time t3 preset by the timer 44 (until the timer 44 outputs a time-up signal). Thereby, the mode switching door 13 is set to a bilevel mode.

When the bilevel switch 10 is not turned on in step S5, the routine proceeds to step S6. When the ventilation switch 11 is turned on in step S6, the mode switching door 13 is set to a ventilation mode position.

Figure 3:
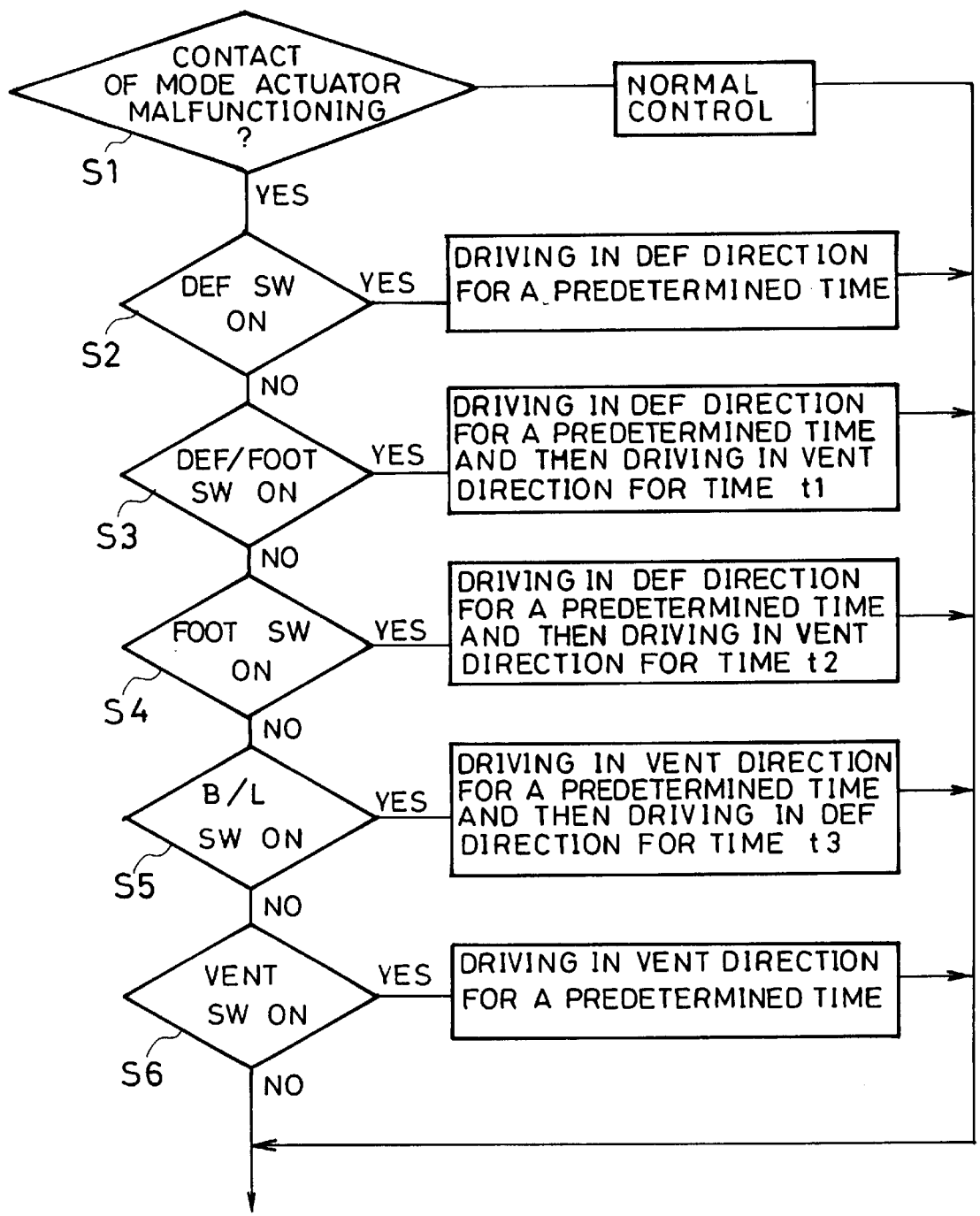
FIG. 3 is a flow chart for explaining the operation of Embodiment 1.

In Embodiment 1 of the present invention, the above defrost mode setting means 40 and the ventilation mode setting means 41 can be realized by a CPU which receives a malfunction detection output from the contact malfunction detection circuit 45 to activate the timers 42, 43 and 44 and executes a processing program for controlling the drive circuit 3 based on the timers in accordance with the processing of FIG. 3.

According to this Embodiment 1, even when the setting unit 19 of the actuator 4 provided with the contact setting unit 19 malfunctions, the mode switching door 13 can be set to a desired mode position so that an appropriate air-conditioning mode can be obtained at need.

Embodiment 2

Figure 5:
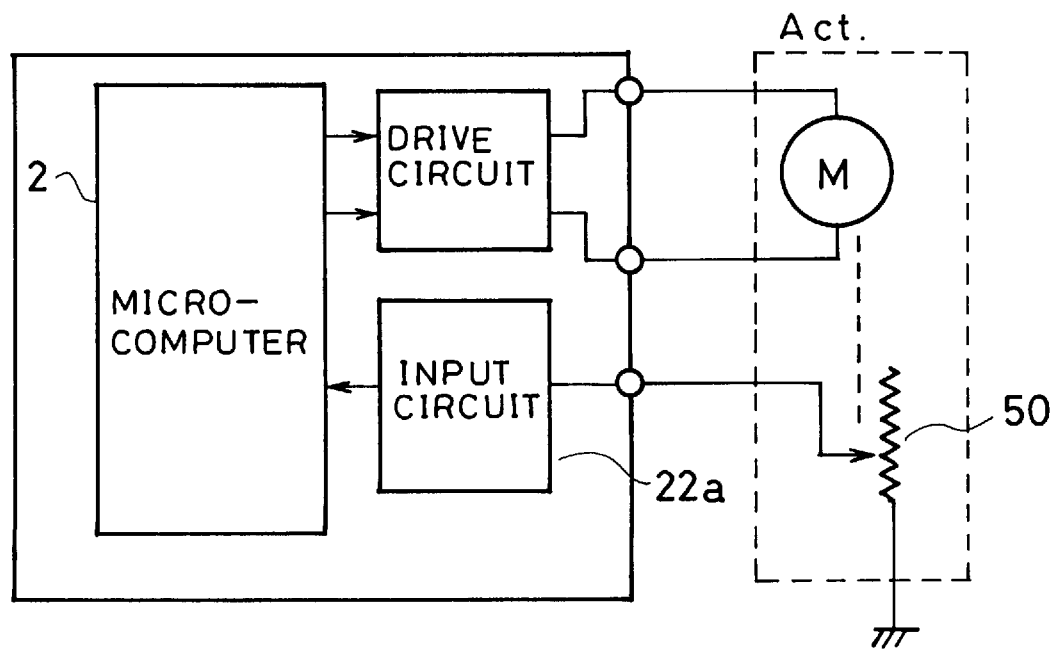
FIG. 5 is a block diagram of Embodiment 2 of the present invention.

As shown in FIG. 5, the present invention can be applied to a control system type of air-conditioning system having a variable resistor 50 coupled to a motor, wherein the resistance value signal of the variable resistor 50 as a setting unit is applied to a microcomputer 2 through an input circuit 22a to be compared with reference values set for respective ventilation mode, bilevel mode, foot mode, defrost/foot mode and defrost mode positions and the motor is stopped when the resistance value signal becomes equal to one of the reference values. The same effects as those of the above-described Embodiment 1 can be obtained.

Figure 4:
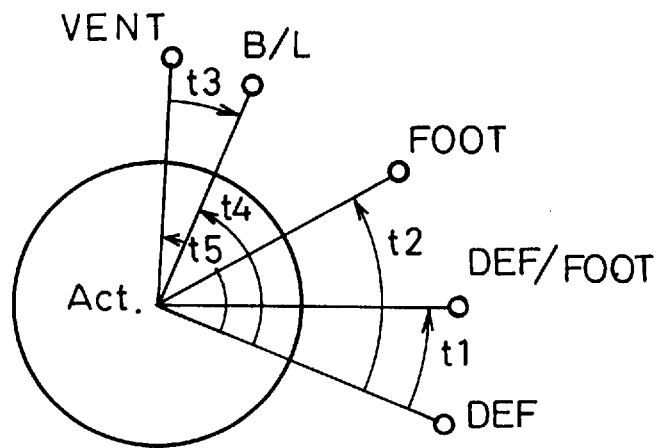
FIG. 4 is a diagram showing the operation of the actuator in Embodiment 1.

In FIG. 4, to set the actuator 4 to a ventilation mode position or a bilevel mode position, these mode positions may be set by turning the actuator 4 reversely from the defrost mode position as a starting point for the time t4 or t5. On the contrary, to set the actuator 4 to a foot mode position, a defrost/foot mode position or a defrost mode position, these mode positions may be set by turning the actuator 4 reversely from the ventilation mode position as a starting point for a predetermined time.

Embodiment 3

A description is subsequently given of another embodiment of the present invention in which a stepping motor actuator is used as the actuator.

Figure 6:
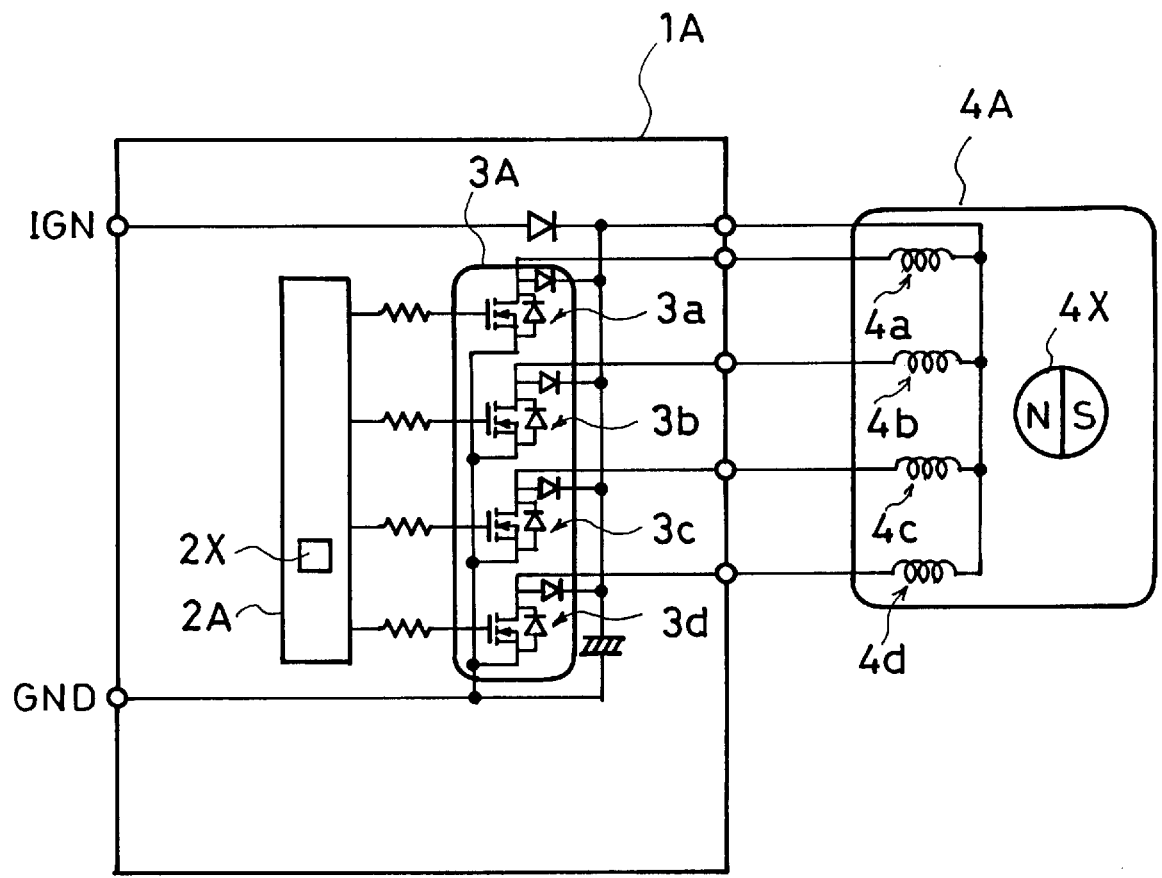
FIG. 6 is a block diagram of Embodiment 3 of the present invention.
Figure 11:
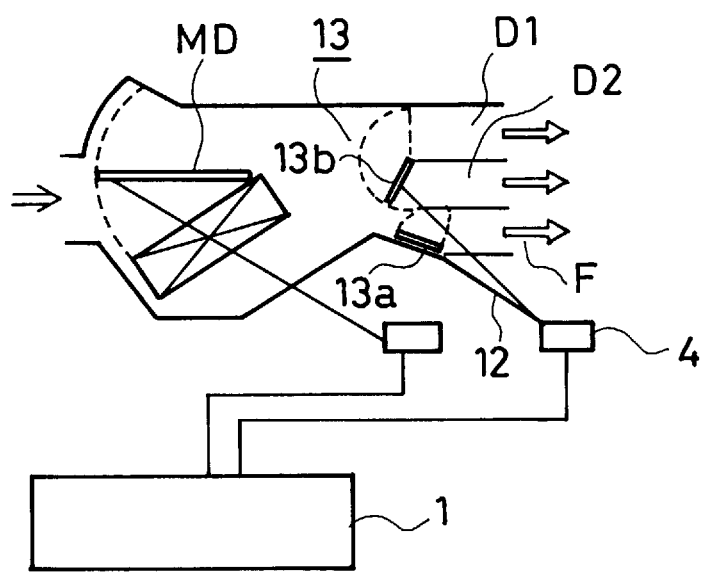
FIG. 11 is a diagram showing an example of a general air-conditioning system.

As shown in FIG. 6, when the stepping motor actuator 4A is used as the actuator, the stepping motor actuator 4A is controlled by a control unit 1A having a microcomputer 2A provided with abnormality detection means 2X and a drive circuit 3A formed of switching FETs. To a rotor 4x equivalent to the motor shaft of the stepping motor actuator 4A is connected a mode switching door 13 (doors 13a and 13b) through a link unit or gear unit 12 as shown in FIG. 11. The microcomputer 2A receives a mode instruction from the mode change-over switch 6, controls the switching FETs 3a, 3b, 3c and 3d (four in FIG. 6, for example) of the drive circuit 3A, and outputs a pulse to poles 4a, 4b, 4c and 4d (four in FIG. 6, for example) connected to these switching FETs to excite each pole so as to turn the rotor 4X. To turn the rotor 4X normally, the poles 4a, 4b, 4c and 4d may be excited in the order named and to turn the rotor 4X reversely, the poles 4a, 4b, 4c and 4d may be excited in the reverse order. The turning angle of the rotor 4X is determined by the number of output pulses (the number of excited poles or the number of phase excited ?? poles). Though not directly connected in Embodiment 3, the turning speed of the rotor 4X is determined by the frequency of output pulses (a time interval between the time when one switching transistor is controlled and the time when the next switching transistor is controlled).

The microcomputer 2A has a mode position memory (register) and controls usually as follows. The microcomputer 2A stores data on, for example, how many pulses should be output to the stepping motor actuator 4A to drive the mode switching door 13 to another mode position from a defrost mode position (or a ventilation mode position) by turning the rotor 4x. To turn the rotor 4X from a DEF position to a FOOT position in FIG. 4, for example, two pulses are required to first control the FET 3a so as to excite the pole 4a and then control the FET 3b so as to excite the pole 4b. Thus, the microcomputer 2A prestores the data as FOOT mode=2. When a FOOT mode instruction was received and the rotor 4x was set to a FOOT position previously, the number of output pulses, that is, 2 is stored (recorded newly) in the above-described mode position memory. Thereafter, when a VENT mode instruction is received from the mode change-over switch 6, since the microcomputer 2A prestores VENT mode=4 that four pulses are required to turn the rotor 4X from a DEF mode position to a VENT mode position, for example, it calculates (4−2(a previous value in the mode position memory as positional information)) to turn the rotor 4X so that the mode switching door is moved from a FOOT mode position to a VENT mode position and outputs two pulses to the poles c and d to turn the rotor 4X so that the mode switching door 13 is moved from a FOOT mode position to a VENT mode position. Thus, the value of the mode position memory is updated sequentially to control the position of the mode switching door by calculating as described above. Though the above case shows that the rotor 4X is turned from a DEF position to a VENT position, to change from a VENT position to a FOOT position, the rotor 4X must be turned reversely. In this case, the result of the above calculation is (2−4)=−2 and hence, it is judged that the rotor 4X must be turned reversely.

Figure 7:
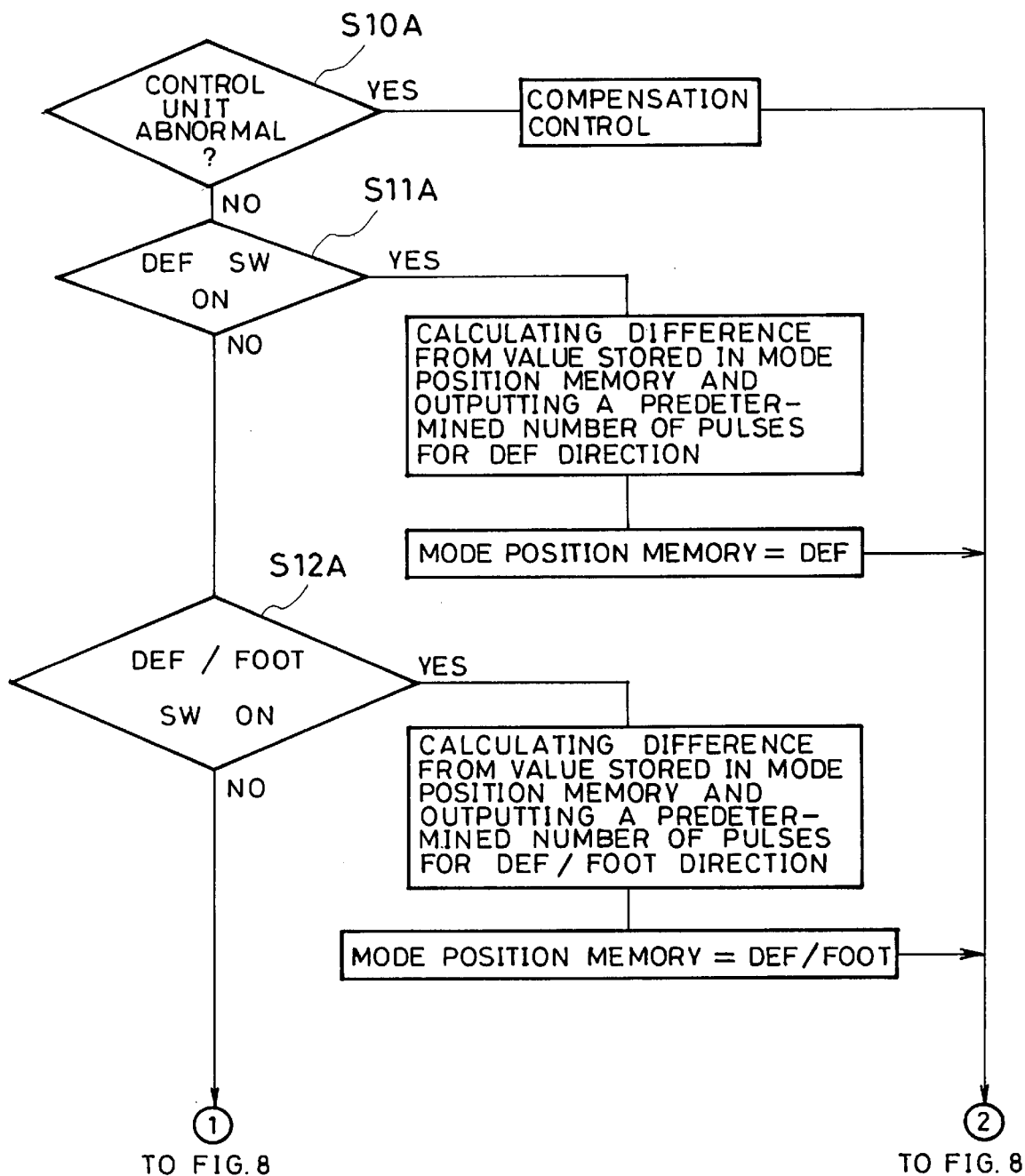
FIG. 7 is a flow chart for explaining the operation of Embodiment 3.
Figure 8:
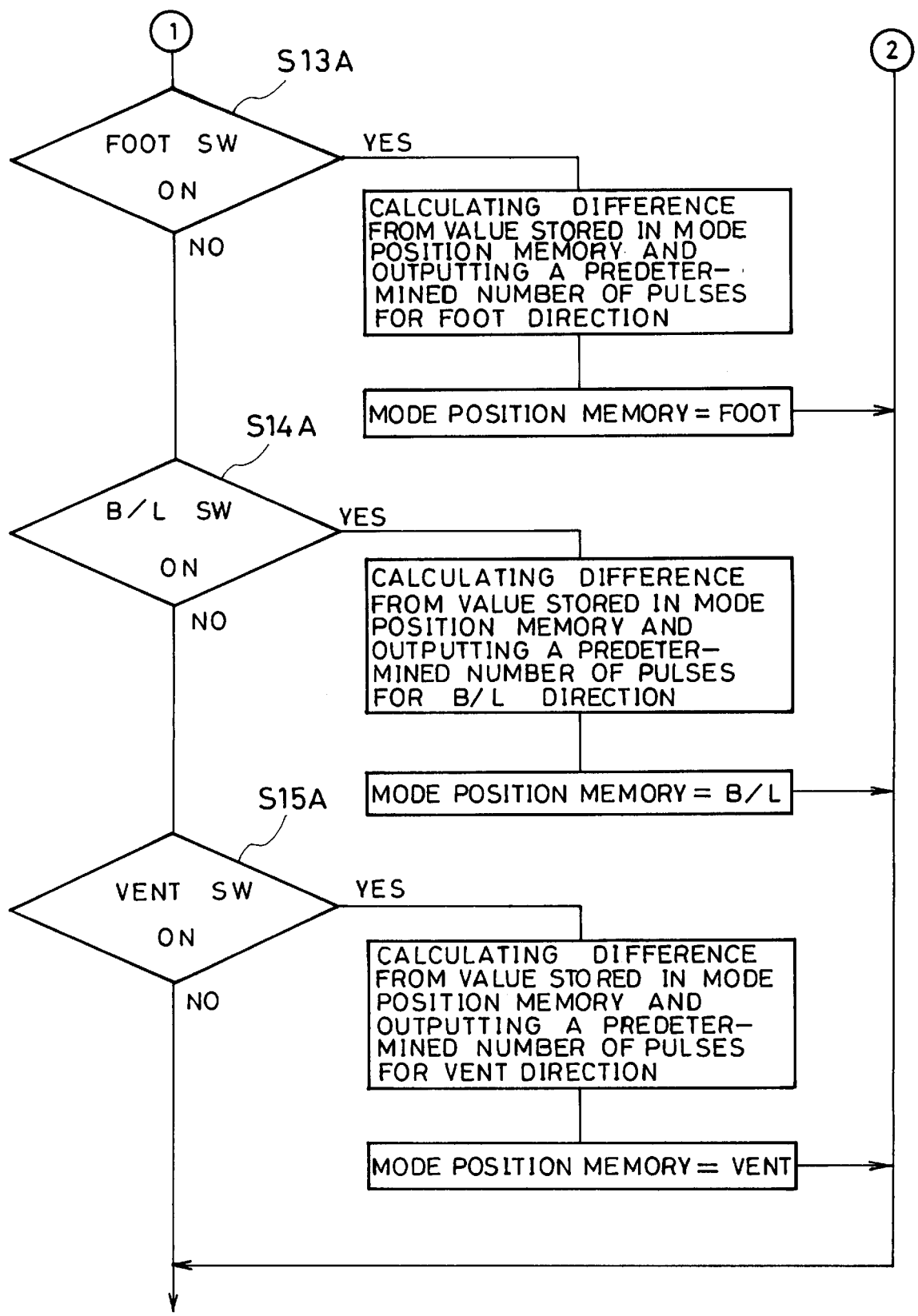
FIG. 8 is a flow chart for explaining the operation of Embodiment 3.

A detailed description is subsequently given of normal processing (the processing of the CPU of the microcomputer 2A) when the control unit is normal with reference to FIGS. 7 and 8.

Figure 9:
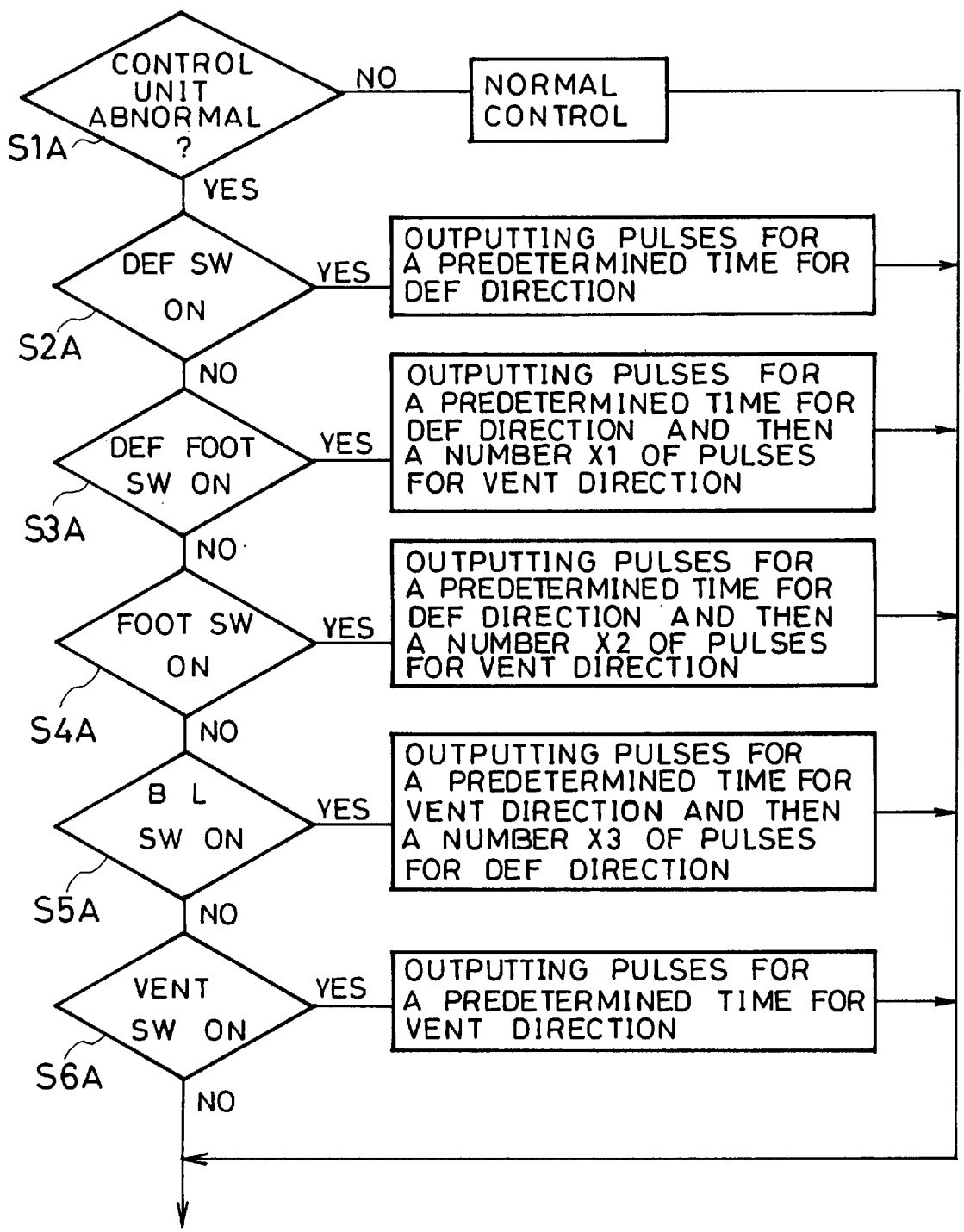
FIG. 9 is a flow chart for explaining the operation of Embodiment 3.

In step S10A, it is judged whether a control unit 1A for controlling the stepping motor actuator 4A is abnormal or not. When the control unit 1A is judged as abnormal, the routine proceeds to compensation control to be described later as shown in FIG. 9.

When the control unit 1A is judged as not abnormal, that is, normal, the routine proceeds to normal control, that is, steps S10A to S15A. In step S 11A, it is first judged whether the defrost switch 7 is turned on. When the defrost switch 7 is turned on, the difference between the value of the current mode position and the value of the previous mode position stored in the mode position memory is obtained and a predetermined number of pulses are output to the drive circuit 3A to drive the mode switching door 13 in a defrost direction. As a result, the mode switching door 13 is set to a defrost mode and DEF positional information is stored in the mode position memory.

When the defrost switch 7 is not turned on, the routine proceeds to step S12A in which it is judged whether the defrost/foot switch 8 is turned on. When the defrost/foot switch 8 is turned on, the difference between the value of the current mode position and the value of the previous mode position stored in the mode position memory is obtained and a predetermined number of pulses are output to the drive circuit 3A to drive the mode switching door 13 in a defrost/foot direction. As a result, the mode switching door 13 is set to a defrost/foot mode and DEF/FOOT positional information is stored in the mode position memory.

When the defrost/foot switch 8 is not turned on, the routine proceeds to step S13A in which it is judged whether the foot switch 9 is turned on. When the foot switch 9 is turned on, the difference between the value of the current mode position and the value of the previous mode position stored in the mode position memory is obtained and a predetermined number of pulses are output to the drive circuit 3A to drive the mode switching door 13 in a foot direction. As a result, the mode switching door 13 is set to a foot mode and FOOT positional information is stored in the mode position memory.

When the foot switch 9 is not turned on, the routine proceeds to step S14A in which it is judged whether the bilevel switch 10 is turned on. When the bilevel switch 10 is turned on, the difference between the value of the current mode position and the value of the previous mode position stored in the mode position memory is obtained and a predetermined number of pulses are output to the drive circuit 3A to drive the mode switching door 13 in a bilevel direction. As a result, the mode switching door 13 is set to a bilevel mode and B/L positional information is stored in the mode position memory.

When the bilevel switch 10 is not turned on, the routine proceeds to step S15A in which it is judged whether the ventilation switch 11 is turned on. When the ventilation switch 11 is turned on, the difference between the value of the current mode position and the value of the previous mode position stored in the mode position memory is obtained and a predetermined number of pulses are output to the drive circuit 3A to drive the mode switching door 13 in a ventilation direction. As a result, the mode switching door 13 is set to a ventilation mode and VENT positional information is stored in the mode position memory.

However, when the stepping motor actuator 4A is used as described above, if some abnormality occurs in the control unit 1A, the positional control of the mode switching door 13 cannot be carried out. This occurs when the CPU of the microcomputer 2A runs recklessly, the CPU of the microcomputer 2A is reset, or a position indicated by a value stored in the mode position memory differs from the target position for some reason or other during the stoppage of the stepping motor actuator 4A.

Then, in Embodiment 3, when some abnormality occurs in the control unit 1A, the same processing shown in FIG. 9 as that of FIG. 3 is carried out. However, since control based on drive pulses is carried out in Embodiment 3 instead of control based on drive time, malfunction compensation control based on pulses X1, X2 and X3 in place of drive times T1, T2 and T3 is carried out.

In step S1A, it is first judged whether the control unit 1A is abnormal or not. When it is not abnormal, normal control as shown in FIGS. 7 and 8 is carried out.

When it is judged based on the output of the abnormality control means 2X that the control unit 1A is abnormal and the position of the mode switching door 13 is set to one of defrost mode, defrost/foot mode, foot mode, bilevel mode and ventilation mode in accordance with the operation of the mode change-over switch 6, it is first judged whether the defrost switch 7 is turned on in step S2A. When the defrost switch 7 is turned on, pulses are output for a predetermined time to drive the mode switching door 13 in a defrost direction. As a result, the mode switching door 13 is set to a defrost mode.

When the defrost switch 7 is not turned on, the routine proceeds to step S3A in which it is judged whether defrost/foot switch 8 is turned on. When the defrost/foot switch 8 is turned on, pulses are output for a predetermined time to drive the mode switching door 13 in a defrost direction and then a predetermined number X1 of pulses are output to drive it in a ventilation direction. As a result, the mode switching door 13 is set to a defrost/foot mode.

When the defrost/foot switch 8 is not turned on, the routine proceeds to step S4A in which it is judged whether the foot switch 9 is turned on. When the foot switch 9 is turned on, pulses are output for a predetermined time to drive the mode switching door 13 in a defrost direction and then a predetermined number X2 of pulses are output to drive it in a ventilation direction. As a result, the mode switching door 13 is set to a foot mode. In this case, after pulses are output for a predetermined time to drive the mode switching door 13 in a ventilation direction, a predetermined number X2' of pulses may be output to drive it in a defrost direction.

When the foot switch 9 is not turned on, the routine proceeds to step S5A in which it is judged whether the bilevel switch 10 is turned on. When the bilevel switch 10 is turned on, pulses are output for a predetermined time to drive the mode switching door 13 in a ventilation direction and then a predetermined number X3 of pulses are output to drive it in a defrost direction. As a result, the mode switching door 13 is set to a bilevel mode.

When the bilevel switch 10 is not turned on, the routine proceeds to step S6A in which it is judged whether the ventilation switch 11 is turned on and pulses are output for a predetermined time to drive the mode switching door 13 in a ventilation direction. As a result, the mode switching door 13 is set to a ventilation mode position.

If the abnormality in the control unit in the above step S1A occurs when the CPU of the microcomputer 2A is reset or when the position specified by the value stored in the mode position memory differs from the target position as described above, the CPU cannot carry out control with reference to the value stored in the mode position memory because the previous value in the mode position memory cannot be used. In the case of such an abnormality, when the abnormality detection means 2A detects such an abnormality as described above, a processing program for carrying out processing as shown in FIG. 9 is loaded onto the CPU of the microcomputer 2A to control the drive circuit 3A. After compensation control is carried out through any one of the steps S2A to S6A of FIG. 9, the position of the mode switching door 13 is stored in the mode position memory so that normal control can be carried out with reference to a value stored in the mode position memory thereafter.

In the constitution of FIG. 6, the microcomputer 2A for carrying out malfunction compensation control shown in FIG. 9 functions as compensation processing means.

Figure 10:
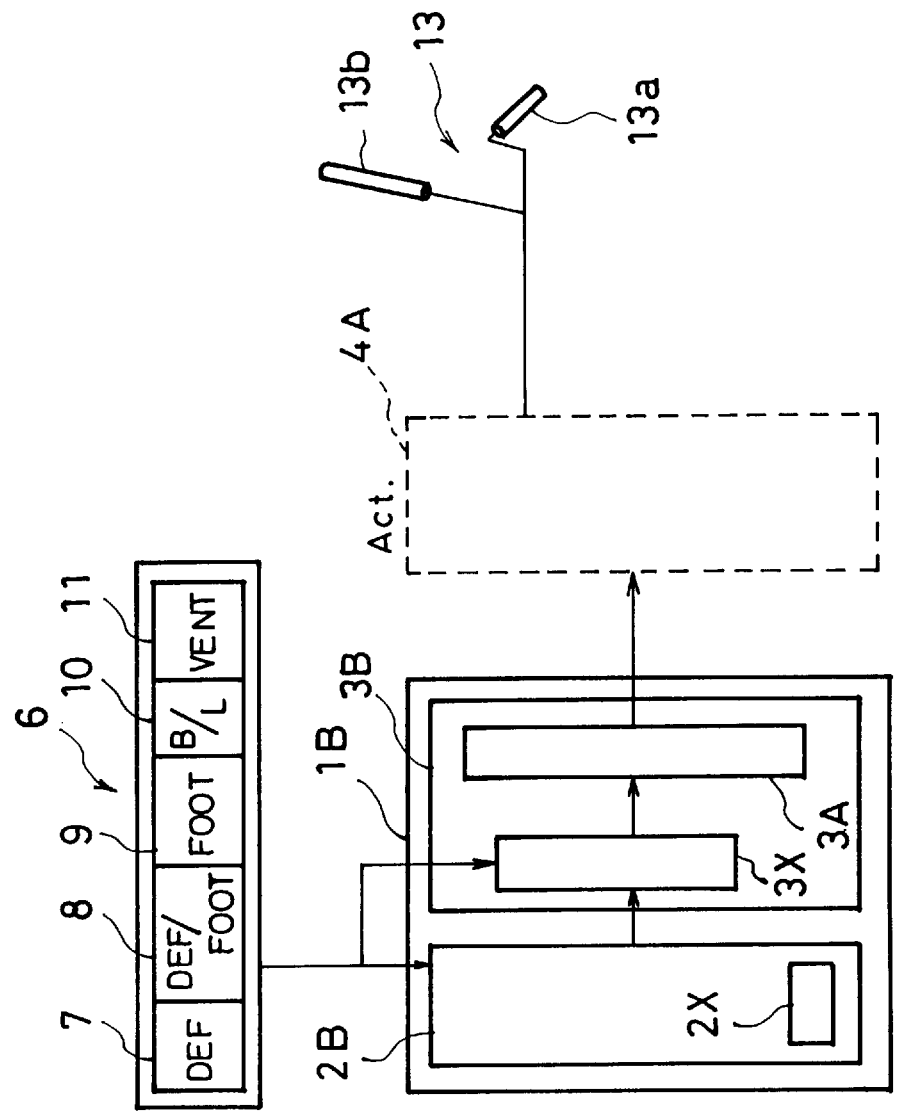
FIG. 10 is a block diagram of Embodiment 3.

With the configuration of the control unit 1B shown in FIG. 10, the processing of FIG. 9 can be carried out even if an abnormality in the control unit is caused by reckless run of the CPU of the microcomputer 2B.

In FIG. 10, reference symbol 1B denotes a control unit which comprises a microcomputer 2B and drive control means 3B. The drive control means 3B has an arithmetic processing unit 3X as compensation processing means, in addition to a drive circuit 3A similar to the drive circuit shown in FIG. 6. In this case, this microcomputer 2B only instructs to turn the rotor 4X normally or reversely and it is the arithmetic processing unit 3X which actually controls the drive circuit 3A. Therefore, the arithmetic processing unit 3X has almost the same functions as those of the microcomputer 2A shown in FIG. 6 except that it does not judge whether the rotor 4X should be turned normally or reversely.

In the above constitution, when the CPU of the microcomputer 2B runs recklessly, an instruction for turning the rotor 4X normally or reversely is not transmitted from the microcomputer 2B to the arithmetic processing unit 3X. However, when the abnormality detection means 2X detects the reckless run of the CPU, a processing program for carrying out the processing of FIG. 9 may be loaded onto the arithmetic processing unit 3X. Thereby, even when the CPU of the microcomputer 2B runs recklessly, the arithmetic processing unit 3X can control the drive circuit 3A in accordance with the processing of FIG. 9 based on an instruction from the mode change-over switch 6 and hence, malfunction compensation control can be carried out at the time of reckless run of the CPU.

In FIG. 10, the output of the mode change-over switch 6 is applied to the arithmetic processing unit 3X. As a matter of fact, when the abnormality detection means 2X detects an abnormality, it controls a bypass switch directly to apply the output of the mode change-over switch 6 to the arithmetic processing unit 3X, bypassing the CPU of the microcomputer 2B.

In the constitution of FIG. 10, also in the case of an abnormality caused by resetting of the CPU of the microcomputer 2B (in this case, an instruction for turning the rotor 4X normally or reversely is not transmitted from the microcomputer 2B until the initialization of the CPU is completed) or by the difference between the position indicated by the value stored in the mode position memory (managed by the arithmetic processing unit 3X in FIG. 10) and the target position as described above (in this case, the arithmetic processing unit 3X cannot carry out positional control with reference to the mode position memory), a processing program for carrying out the processing of FIG. 9 is loaded onto the arithmetic processing unit 3X to control the drive circuit 3A, thereby making it possible to carry out malfunction compensation control as a matter of course.

According to Embodiment 3, also when the stepping motor actuator 4A is use and some abnormality occurs in the control unit for controlling this stepping motor actuator 4A, the same effect as that of Embodiments 1 and 2 can be obtained.

What is claimed is:

1. A malfunction compensation method for an air-conditioning system comprising an actuator which drives a mode switching door and has a setting unit consisting of contacts for setting the mode switching door to at least ventilation mode, bilevel mode, foot mode and defrost mode positions and a control unit which drives the actuator based on the operation of a mode change-over switch and stops it at a position set by the setting unit, the method comprising turning the actuator to a ventilation mode position or a defrost mode position and then turning the actuator reversely from the above position as a starting point for a predetermined time to enable the actuator to be set to another mode position at the time of malfunctioning of the setting unit.

2. A malfunction compensation method for an air-conditioning system comprising an actuator which drives a mode switching door and has a setting unit consisting of contacts for setting the mode switching door to at least ventilation mode, bilevel mode, foot mode and defrost mode positions and a control unit which drives the actuator based on the operation of a mode change-over switch and stops it at a position set by the setting unit, the method comprising turning the actuator to a defrost mode position when a defrost switch is turned on; turning the actuator to the defrost mode position and then turning it reversely for a predetermined section when a foot switch is turned on; turning the actuator to the defrost mode position and then turning it reversely for a section shorter than the above reverse section when a defrost/foot switch is turned on; turning the actuator to a ventilation mode position when a ventilation switch is turned on; and turning the actuator to the ventilation mode position and then turning it reversely for a predetermined section when a bilevel switch is turned on at the time of the malfunctioning of the setting unit.

3. The method of claim 1, wherein the reverse time is set in accordance with the drive voltage of the motor of the actuator and the actuator is turned reversely for this reverse time.

4. A malfunction compensation method for an air-conditioning system comprising a stepping motor actuator for driving a mode switching door and a control unit for driving and controlling the stepping motor actuator such that the mode switching door is set to a desired position such as at least ventilation mode, bilevel mode, foot mode or defrost mode position based on the operation of a mode change-over switch, the method comprising turning the stepping motor actuator to a ventilation mode position or a defrost mode position and then turning the stepping motor actuator reversely from the above position as a starting point to enable the stepping motor actuator to be set to another mode position when the control unit is abnormal.

5. A malfunction compensation method for an air-conditioning system comprising a stepping motor actuator for driving a mode switching door and a control unit for driving and controlling the stepping motor actuator such that the mode switching door is set to a desired position such as at least ventilation mode, bilevel mode, foot mode or defrost mode position based on the operation of a mode change-over switch, the method comprising turning the stepping motor actuator to a defrost mode position when a defrost switch is turned on; turning the stepping motor actuator to the defrost mode position and then turning it reversely for a predetermined section when a foot switch is turned on; turning the stepping motor actuator to the defrost mode position and then turning it reversely for a section shorter than the above reverse section when a defrost/foot switch is turned on; turning the stepping motor actuator to a ventilation mode position when a ventilation switch is turned on; and turning the stepping motor actuator to the ventilation mode position and then turning it reversely for a predetermined section when a bilevel switch is turned on when the control unit is abnormal.

6. A malfunction compensation apparatus for an air-conditioning system comprising a stepping motor actuator for driving a mode switching door, a mode change-over switch and a control unit for driving and controlling the stepping motor actuator such that the mode switching door is set to a desired position such as at least ventilation mode, bilevel mode, foot mode or defrost mode position based on the operation of a mode change-over switch, wherein the control unit comprises:
   drive means for driving the stepping motor actuator;
   abnormality detection means for detecting an abnormality in the control unit; and
   compensation processing means for controlling the drive means to set the stepping motor actuator to another mode position by turning it to a ventilation mode position or a defrost mode position and then turning the stepping motor actuator reversely from the above position as a starting point for a predetermined time when an abnormality is detected by the abnormality detection means.

7. A malfunction compensation apparatus for an air-conditioning system comprising a stepping motor actuator for driving a mode switching door, a mode change-over switch and a control unit for driving and controlling the stepping motor actuator such that the mode switching door is set to a desired position such as at least ventilation mode, bilevel mode, foot mode or defrost mode position based on the operation of a mode change-over switch, wherein the control unit comprises:
   drive means for driving the stepping motor actuator;
   abnormality detection means for detecting an abnormality in the control unit; and
   compensation processing means for controlling the drive means to turn the stepping motor actuator to a defrost mode position when a defrost switch is turned on, turn the stepping motor actuator to the defrost mode position and then turn it reversely for a predetermined section when a foot switch is turned on, turn the stepping motor actuator to the defrost mode position and then turn it reversely for a section shorter than the above reverse section when a defrost/foot switch is turned on, turn the stepping motor actuator to a ventilation mode position when a ventilation switch is turned on, and turn the stepping motor actuator to the ventilation mode position and then turn it reversely for a predetermined section when a bilevel switch is turned on when an abnormality is detected by the abnormality detection means.

8. The apparatus of claim 6, wherein the compensation processing means is formed of a microcomputer.

9. The apparatus of claim 6, wherein the control unit has a microcomputer for instructing to turn the stepping motor actuator normally or reversely, and the compensation processing means is formed of an arithmetic processing unit for controlling the drive means based on an instruction from the microcomputer.

* * * * *